(12) United States Patent
Behnke

(10) Patent No.: US 8,635,840 B2
(45) Date of Patent: Jan. 28, 2014

(54) DEVICE FOR DETECTION AND DETERMINATION OF THE COMPOSITION OF BULK MATERIAL

(75) Inventor: Willi Behnke, Steinhagen (DE)

(73) Assignee: CLAAS Selbstfahrende Erntemaschinen GmbH, Harsewinkel (DE)

( * ) Notice: Subject to any disclaimer, the term of this patent is extended or adjusted under 35 U.S.C. 154(b) by 230 days.

(21) Appl. No.: 13/150,436

(22) Filed: Jun. 1, 2011

(65) Prior Publication Data

US 2012/0004815 A1 Jan. 5, 2012

(30) Foreign Application Priority Data

Jul. 1, 2010 (DE) .......................... 10 2010 017 688

(51) Int. Cl.
*A01D 41/127* (2006.01)
(52) U.S. Cl.
USPC ....................... 56/10.2 R; 460/1; 460/2; 460/4
(58) Field of Classification Search
USPC ...... 56/10.2 R, 10.2 B, 10.2 C, 10.2 J; 460/1, 460/2, 4, 7; 701/50
See application file for complete search history.

(56) References Cited

U.S. PATENT DOCUMENTS

| 4,068,223 | A | * | 1/1978 | Steffen | 340/608 |
| 5,282,389 | A | * | 2/1994 | Faivre et al. | 73/861.73 |
| 5,920,018 | A | * | 7/1999 | Wilkerson et al. | 73/861.41 |
| 6,421,990 | B1 | * | 7/2002 | Ohlemeyer et al. | 56/10.2 R |
| 7,249,449 | B2 | * | 7/2007 | Goering et al. | 56/30 |
| 7,861,606 | B2 | * | 1/2011 | Kormann | 73/863.53 |
| 7,877,969 | B2 | | 2/2011 | Behnke | |
| 2003/0217538 | A1 | * | 11/2003 | Pirro | 56/16.4 A |

FOREIGN PATENT DOCUMENTS

EP 1 763 988 3/2007

* cited by examiner

*Primary Examiner* — Alicia Torres
(74) *Attorney, Agent, or Firm* — Michael J. Striker

(57) ABSTRACT

A device for detection and determination of a composition of a bulk material has an image recording unit, a control unit, a memory unit and a selection unit to enable a qualified determination to be made, during a transfer of a crop material flow into a container of an agricultural harvesting machine, of a composition of a crop during processing of the crop material. The determination enables changing of adjustment parameters of working assemblies of the agricultural harvesting machine during the processing of the crop material. The image recording unit has at least two image detectors for recording images or image series of the crop material flow.

12 Claims, 2 Drawing Sheets

DEVICE FOR DETECTION AND DETERMINATION OF THE COMPOSITION OF BULK MATERIAL

CROSS-REFERENCE TO RELATED APPLICATION

The invention described and claimed hereinbelow is also described in German Patent Application DE 10 2010 017 688.5 filed on Jul. 1, 2010. This German Patent Application, whose subject matter is incorporated here by reference, provides the basis for a claim of priority of invention under 35 U.S.C. 119(a)-(d).

BACKGROUND OF THE INVENTION

The present invention relates in general to the field of agriculture and the processing of harvested crops.

Vehicles designed to pick up and process crops—in particular self-propelled agricultural harvesting machines—are used for this purpose. The self-propelled agricultural harvesting machines are typically combine harvesters, forage harvesters, and all types of lifters that are operated to cut and/or gather crop material. Such machines typically can process the crop material in a known manner after cutting and/or gathering. One example will be described with reference to a combine harvester. In a combine harvester, cut ears of the crop material are conveyed into the interior of the machine, where the grain is separated from the rest of the biological crop material in a threshing and cleaning process. The resulting cleaned grain is conveyed to a grain tank in the combine harvester, while short parts of straw, chaff, tailings, husks, dust, etc. are returned to the field. However, not all of the grains are threshed out entirely from the ears of the crop material in the threshing process, and so a combine harvester comprises—in a known manner—a forward grain path and a return path, i.e. a mechanical return path, via which incompletely threshed ears are returned to the threshing process to be threshed again.

The setting of the working assemblies in the combining process is therefore particularly significant. If the setting for the threshing mechanism is too acute, the portion of damaged grain becomes too great, which is undesirable. If the setting is too gentle, grains that have not been fully threshed enter the crop material, which interferes with the further processing thereof. Husks and short straw that enter the crop material flow during threshing may be removed in a separating unit located downstream of the threshing stage, although a setting of the separating unit that is too acute may also result in grain losses. It is therefore very important to the land manager to collect high-quality crop material in the grain tank, and to avoid crop material losses in order to maintain a desired level of quality. Due to cross compliance and other quality parameters, the requirements on product safety are increasing in the production of foodstuff, and fodder. Consistent product safety can be ensured only if the composition of the crop material in the grain tank is detected and determined e.g. relative to the trimmings contained in the grain tank (miscellaneous impurities, extraneous seeds, damaged grain, shrivelled grains, chaff, etc.). The detection and determination of the quality of crop material in the grain tank is therefore particularly significant.

The invention therefore relates to a device for detecting and determining the composition of bulk material, in particular crop material, seeds, or other pourable agricultural products, which enables a qualified determination to be made—during transfer to the grain tank of agricultural harvesting machines, in particular self-propelled harvesting machines—regarding the composition of the crop material during the processing of the crop material, in order to thereby change or optimize the parameter settings of the working assemblies of an agricultural harvesting machine during the processing of the crop material, to ensure that the quality of the crop material after harvesting and processing is always optimal, and to thereby meet the increased quality requirements.

The quality of the crop material must be determined in order to continuously optimize the working assemblies to ensure the desired level of quality of the grain tank contents. Optimization means that the adjustment parameters of the working assemblies, or the combine harvester settings, can be changed as needed on the basis of the analysis of the crop material flow.

A device known from the prior art, which monitors the contents of the grain tank during combining and can change the adjustment parameters for the threshing units is known from EP 1 763 988 A1.

Document EP 1 763 988 A1 discloses a combine harvester which comprises an image detector at a position along the crop-material conveyance path, which is at the outlet of the grain elevator in this case, i.e. at the transition to the grain tank. The image detector is used to record images of the crop material flowing out of the grain elevator. A CCD camera is used as the image detector. The quality of the crop material flow is checked by reference to said images. The crop material flow is inspected for impurities such as remaining straw pieces, husks, non-threshed ears, etc., and portions of damaged grain. The images of the crop material flow recorded by the camera can be shown via a control unit in a display located in the driver's cab, thereby enabling the operator or driver to influence the adjustment parameters of the threshing units or to make changes thereto. The control unit also contains a series of reference images which can be used for comparison with the recorded images in order to identify any deviations in the images recorded in the combining process from the reference images, and to enable quality to be assessed relative to the reference images. This method of determining the quality of crop material has been thoroughly confirmed.

However, one disadvantage thereof is that grain, damaged grain, and non-grain components, and fine dust separate into different layers at the point of image measurement, or have already become separated. Said separation of the crop material flow is caused by the centrifugal forces that act on the flow of crop material. The flow of crop material must be accelerated to be conveyed out of the grain elevator and into the grain tank. The acceleration of the crop material flow out of the grain elevator causes the diverse composition of the crop material flow to become separated. Since some components of the crop material flow are lighter-weight and others are heavier, the crop material flow separates into different layers, the detection of which by the image recording unit does not allow the quality of the components of the crop material to be assessed with sufficient accuracy, because all layers are not detected in a homogeneous manner.

SUMMARY OF THE INVENTION

The problem addressed by the invention is therefore that of creating a device for the detection and determination of the composition of bulk material, in particular crop material in grain tanks of agricultural harvesting machines of the initially stated type, which prevents the stated disadvantages of the devices known from the prior art, and of providing a technical solution that enables improved detection of the crop material flow to determine the quality of the crop material.

According to the invention, the image recording unit comprises at least two image detectors which are suitable for recording images or image series of a crop material flow at equidistant intervals or permanently, and which are preferably offset by 180 degrees relative to one another as viewed at an angle in the circumferential direction on an imagined circular trajectory, wherein one image detector is disposed approximately perpendicularly to the top side of the surface of the crop material flowing out of the grain elevator head or the discharge chute, and the other image detector is disposed approximately perpendicularly to the underside of the surface of the crop material flow. Two CCD cameras can be used as image detectors. They are suitable for producing images or image series of a crop material flow at equidistant intervals or permanently, as the crop material flow is transferred to a container. The crop material flow is usually transferred at the discharge point of agricultural harvesting machines. It can be the discharge point at the elevator head of a combine harvester or at the discharge chute of a forage harvester.

The two image detectors are therefore installed at a position downstream of working assemblies that process the crop material. By placing at least one image sensor on the underside and one image sensor on the top side of the crop material flow, illumination and therefore image recognition of the crop material flow is improved, thereby resulting in high-quality image evaluation and, therefore, a more effective analysis of the composition of the crop material flow for the presence of remaining components. Illumination, e.g. of the underside of the crop material flow, which is also referred to as the backside of the crop material, can therefore improve the picture that is taken of the top side of the crop material flow given a thinner layer thickness of the crop material flow. The brightness of the picture is increased, thereby also improving the object recognition in the image and, therefore, the analysis in the image evaluation for the presence of certain image features. The images or image series produced by the two image detectors are transmitted to a memory unit for analysis, as described in EP 1 763 988 A1, and the recorded images or image series are analyzed with reference to the stored images or image series using the selection unit; due to the separation effect, the composition of the crop material flow exhibits differences in the captured images or image series from the upper image detector and the lower image detector. These differences should be detected, and the composition should be determined using the method described above. Finally, the control parameter setting values which can be used to adjust or change the related working assemblies are assigned to the values obtained in the analysis. For example, one control parameter setting value, to name but a few, can affect the threshing mechanism which reduces the portion of damaged grain. Another control parameter setting value can simultaneously affect the separating unit, for example, which is used to reduce the portion of husks and short straw, etc., independently of the threshing mechanism.

Preferably the image detectors can be disposed opposite one another. Placing the image detectors opposite one another results in even more advantages according to the invention. For instance, by placing the image detectors opposite one another, the layer thickness of the crop material flowing through the elevator head or discharge chute can be determined. The image-processing measurement makes it possible to determine the volumetric flow rate of the crop material flow in a self-propelled agricultural machine, in particular in a forage harvester, using an appropriate algorithm in the control unit. The volumetric flow rate determined using the image evaluation method can be displayed visually to the driver in the display unit. The measured quantity that is determined can also be used to evaluate the compressibility of the crop material in the silo by adjusting the length of cut of the crop material given a constant throughput, wherein the resulting change in volume is a measure of the compressibility of the crop material. The value of the compressibility is calculated on the basis of the measured quantity.

Another advantage according to the invention, which is obtained by placing the image detectors opposite one another, is that a further measured quantity can be ascertained. Said measured quantity relates to the transparency of the crop material flow. To measure the transparency of the crop material flow, the crop material flow is illuminated from only one side. The illumination can be carried out by the image detector on the top side, for instance, while the opposite image detector, on the underside, detects the light and thereby checks the transparency of the crop material flow. In other words, the crop material flowing between the two image detectors is illuminated by one image detector of the image recording unit, and the image detector disposed opposite to the illuminating image detector detects the incident light. The illuminating image detector can be the image detector on the top or the bottom. The image detector that receives the light is then always the opposite image detector on either the top or bottom. On the basis of the quantity that is measured, a value is calculated in the control unit that characterizes the dust portion in the crop material flow. This measurement procedure of checking the transparency of the crop material flow can be used to ascertain and determine the dust portion in the crop material flow. In turn, the evaluation of the dust portion in the crop material flow is a measure e.g. of the setting of the working unit and/or the separating unit.

Given that the image recording unit comprises two image detectors, it is now possible to perform one more measurement compared to the prior art. Advantageously, another advantage according to the invention of the optical image recognition system is utilized in a grain elevator used to transport the crop material flow to the grain tank. A grain elevator is basically composed of a chute which is closed to the greatest extent possible, and in which so-called elevator paddles circulate in a manner similar to that of a dumbwaiter. Preferably, the picture-taking of the crop material flow is synchronized with the discharge from the elevator paddles. In this case, "discharge from the paddles" describes the moment when the crop material from the elevator paddle of the grain elevator is accelerated by the centrifugal forces that occur at the turning point of the elevator paddles, and is discharged into the grain tank. The turning point is basically a turning region. The turning region is the transition of the ascending elevator paddles to the descending elevator paddles in the grain elevator. Strictly speaking, the turning region is an extension of 180 degrees on a radius, through which the elevator paddles move. This means that the image recording unit does not start recording the image of the crop material flow until an elevator paddle has reached the discharge position. The discharge position is used to trigger both image detectors.

The image recording unit can also be triggered by the yield sensor disposed in the grain elevator. The yield sensor can be composed of a simple light barrier disposed in the chute of the grain elevator. The light barrier is designed such that the light beam does not strike the paddle surface perpendicularly. The light beam extends horizontally to the elevator paddle and perpendicularly from one lateral edge to the other lateral edge. Due to this configuration, it is ensured that crop material is detected if crop material is present on the elevator paddle and moves through the light beam of the sensor. The sensor therefore reliably determines whether crop material is present on the elevator paddle or not. This means that the image recording unit is triggered or the image recording unit records an image only if a certain quantity of crop material is present on the elevator paddle. Image recording by the image recording unit is controlled as a function of the elevator paddle position and according to the volume of the crop material on the elevator paddle. Depending on the setting entered by the operator, an image can be recorded permanently or at equidistant intervals of the elevator paddles, or as a function of the position of the elevator paddle flaps and/or the volume of the crop material on the elevator paddles.

Alternatively, a yield sensor in the form of a baffle plate and a weight sensor assigned thereto can be disposed in the region of the discharge point at the elevator head. The baffle plate, on which the weight sensor is disposed, must be checked regularly for contamination, but is difficult to access due to the exposed placement thereof in the elevator head. Contaminations that can deposit on the surface of the baffle plate facing the crop material flow must be removed to prevent corruption of the measurement result. To prevent these disadvantages, it is provided according to the invention to monitor the baffle plate, comprising the weight sensor disposed thereon, using the image recording unit, and to clean same using an additionally installed cleaning unit. The latter can take place in an automated manner or as necessary, wherein the operator of the agricultural harvesting machine is informed of the contamination level of the surface of the baffle plate, so that said operator can initiate the cleaning procedure.

Advantageously, one of the image detectors—which are located at the discharge point of the grain elevator—of the image recording unit can be positioned such that the surface of the baffle plate is located in the field of view of the image detector. It is therefore possible to check the contamination of the surface of the baffle plate using the image recording unit. Such an inspection can take place in the operating state when the grain elevator idles. Another way to improve the prevention of a contaminated state is to keep the surface of the baffle plate clean using a remote-controllable cleaning unit, and/or to clean same as needed. Said cleaning process can take also place automatically given that optical image monitoring is carried out. The operator controls the cleaning unit via the operating unit in the driver's cab, and the cleaning process can be monitored via the display.

Advantageously, the image detectors—according to the invention—of the image recording unit can also be used to monitor the technical state of the elevator paddles of the grain elevator. If wear or the absence of one or more elevator paddles is detected, which requires that one or more elevator paddles be replaced or repaired, a visual message is displayed to the operator in the display of the operating unit. Furthermore, the optically determined, technical state of the elevator paddles is stored on a storage medium in the operating unit. The recorded images can be downloaded from the storage medium by a maintenance technician. The images of the technical state of the elevator paddles are recorded while the combine harvester is in the operating state, preferably during a pause in the harvesting operation, by the upper image detector of the image recording unit. While the grain elevator idles, the upper image detector produces images or image series of the elevator paddles, which are subsequently compared in the control unit with selected images of new elevator paddles, to identify wear. Depending on the default setting of the display on the operating unit, the images or image series of the elevator paddles can be displayed to the operator "just in time" or after automatic evaluation with control unit, in the display of the display device.

While the grain elevator idles, and when the image is recorded during the pause in harvesting operation, the lower image detector ascertains the elevator-paddle clearance between the elevator head wall and the elevator paddles in order to determine the distance of the elevator paddles from the elevator head wall. In this case as well, the image is evaluated in the control unit, and the result is shown in the display of the display unit. The display can be a warning or a maintenance alert. If the distance between the elevator head wall and an elevator paddle falls below a predetermined amount or a predetermined distance, this is a sign of insufficient chain tension, or can indicate chain wear. The chain is the carrier and transporter of the elevator paddles, and defines the crop-material conveyance path in the elevator chute for the crop material.

In a preferred development of the device according to the present invention, as a further variant, up to four image detectors are used to detect and determine the composition of the crop material flow. All of the image detectors are likewise interspaced on an imagined circular trajectory at an angle as viewed in the circumferential direction, preferably separated by 90 degrees. Other distances between the four image detectors are also feasible, of course. For example, the two adjacent image detectors disposed to the right and left of the lower image detector can each be situated 60 degrees away from the lower image detector, which means that each one is situated 120 degrees away from the upper image detector.

Further combinations of the distances of the image detectors relative to each other are feasible on the basis of empirical values of the separation effects of the crop material flow. Said configurations make it possible to record an image of the crop material flow from four sides, i.e. from the top, bottom, and both sides. This advantage—according to the invention—of the configuration of up to four image detectors ensures optimal illumination of the crop material flow from all sides, thereby ensuring optimal detection of layers of the crop material flow created by the separation effect, and primarily enabling a change in the layers of the crop material flow to be detected immediately. The image evaluation and, therefore, evaluation of the composition of the crop material flow for the presence of remaining components, can be analyzed more effectively. Due to the early determination of the composition of the crop material flow, the adjustment parameters of the working assemblies can be adapted immediately, and consistent quality of the crop material in the grain tank can be ensured.

According to the invention, in a preferred embodiment of the device, at least one image detector of the image recording unit is movable. Each of the image detectors is disposed in a housing part, at least one of which is movably supported. Advantageously, the housing part of an image detector can be displaced by a certain angle on a circular arc in an alternating manner. As viewed from the lower position of an image detector, the displacement can take place between 0 degrees and 180 degrees, and therefore only one image detector is required in the image recording unit. If two housing parts are preferably movably disposed on a circular trajectory, the housing parts and therefore the image detectors can be displaced individually or simultaneously. The housing parts need only be displaced in the range of 0 degrees to 90 degrees in this case in order to optimally detect the separation effects in the crop material flow, using the imaging method, during discharge from the grain elevator. Due to the displacement of the image recording unit or individual image detectors, the crop material flow can be scanned or detected from all directions, and therefore the quality of the composition of the crop material flow can be determined from all directions, even though only two image detectors are used to record images. A drive device comprising a holder for moving the housing part is easy to produce. As a precondition thereof, a tubular section must be placed in the region of the grain elevator head, on which the movable image recording unit can be disposed.

Due to the large number of measurements that can be performed by the image recording unit, the device according to the invention in every technical embodiment described above is suited for excellent monitoring of the crop material flow upon transfer to a container, and for monitoring technical devices. The analysis of the measurement results or the image evaluation in the control unit makes it possible to optimize the adjustment parameters of the working assemblies during the harvesting operation, in order to ensure consistent quality of crop material in the grain tank. Further advantages of the image recording unit according to the invention include monitoring technical devices for wear, e.g. on movable parts such as the elevator paddles. Monitoring helps to increase safety, and the service life during harvesting operation of the self-propelled agricultural machine is extended.

The novel features which are considered as characteristic for the present invention are set forth in particular in the appended claims. The invention itself, however, both as to its construction and its method of operation, together with additional objects and advantages thereof, will be best understood from the following description of specific embodiments when read in connection with the accompanying drawings.

DESCRIPTION OF THE PREFERRED EMBODIMENTS

Figure 1:
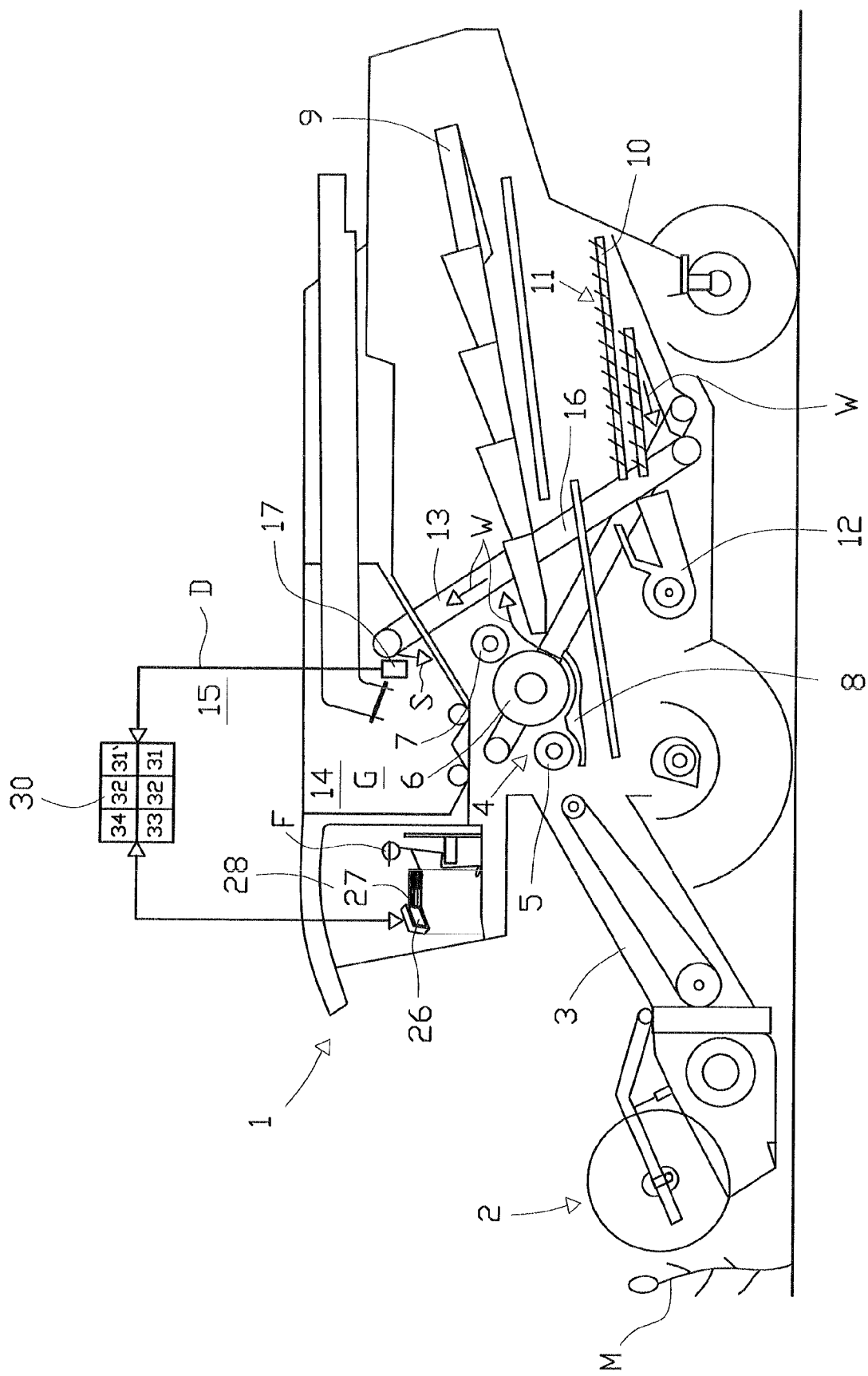
FIG. 1 shows a schematic cross section of a self-propelled agricultural harvesting machine comprising a system for the detection and determination of the composition of bulk material.

FIG. 1 shows, in a schematic representation, an embodiment of a self-propelled agricultural harvesting machine 1 comprising device 15 according to the invention. It is a combine harvester 1 in the embodiment shown. Device 15 according to the invention is composed mainly of two components, i.e. an image recording unit 17 and a control unit 30. Image recording unit 17 produces images or image series of crop material flow S before a crop material flow S is transferred to a container 14. The images or image series that are generated are transmitted to control unit 30. The images or image series are analyzed in control unit 30 to evaluate the composition of crop G. On the basis of the analytical results, control unit 30 can be used to influence the adjustment parameters of working assemblies of combine harvester 1 automatically or manually. The influencing is used to attain the most consistent quality possible of crop G in grain tank 14. Device 15 according to the invention is not expressly limited to combine harvester 1, however.

Crop material M is picked up by combine harvester 1 using the known means of a header 2 and a feed rake 3, and is processed using the known working assemblies, such as threshing part 4 composed of a pre-acceleration cylinder 5, a cylinder 6, an impeller 7, a concave 8, and a separating unit composed of a straw walker 9, a tailings region 10, and a cleaning unit 11 comprising a blower 12, in order to obtain crop G. Reference is made here to the more detailed explanations in the prior art in EP 1 763 988 A1 regarding the individual processes in combine harvester 1. Along crop-material conveyance path W, crop material flow S is conveyed to grain tank 14 via a grain elevator 13.

Figure 2:
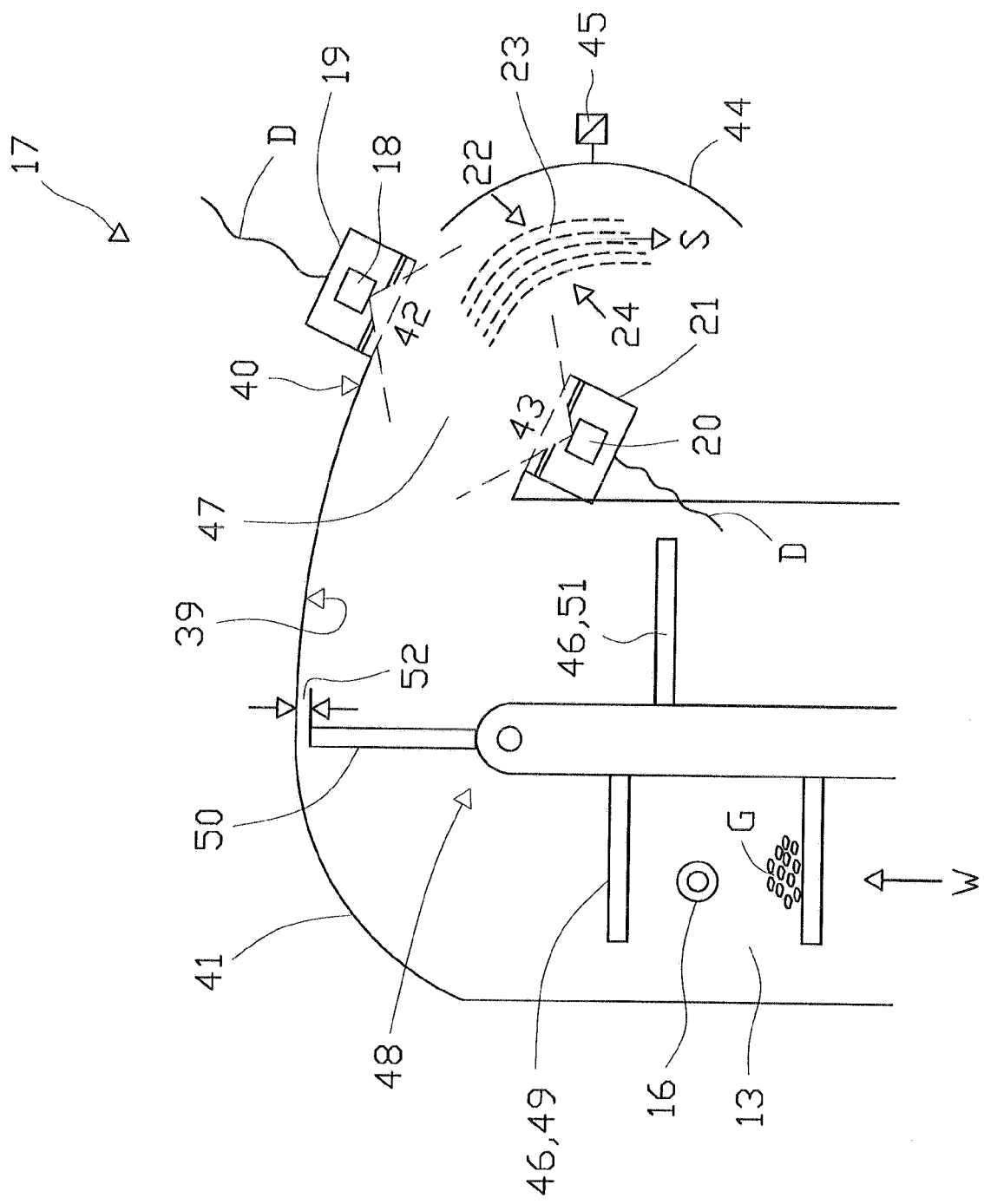
FIG. 2 shows a perspective representation of an image recording unit at the outlet of a grain elevator.

Device 15 for the detection and determination of the composition of crop G—which enables a qualified determination to be made during the transfer of crop material flow S to grain tank 14 of combine harvester 1 regarding the composition of crop material flow S during processing of crop material M, in order to enable the adjustment parameters e.g. of the most important working assemblies 4, 5, 6, 7, 8, 9, 10, 11, 12 of a combine harvester 1 to be changed during processing of crop material M—comprises an image recording unit 17 composed of two image detectors 18, 20, as shown in FIG. 2, each of which is disposed in a housing part 19, 21, and a control unit 30 comprising a memory unit 31 and a selection unit 32. Control unit 30 comprising memory unit 31 and selection unit 32 is identical to that in the system known from EP 1 763 988 A1. Control unit 30 as a whole, and a computer program 33 contained therein, selection unit 32, and the reference images stored in memory units 31, 31' are adapted to the new invention, of course, so that the recorded images or image series can be automatically analyzed in terms of the composition of crop material flow S. The images or image series of crop material flow S recorded by image recording unit 17 are transmitted to control unit 30.

Control unit 30 also comprises an image analysis unit 34 and at least one further memory unit 31 for storing current images or image series, wherein memory unit 31 stores the images or image series produced by image recording unit 17. The images and image features required for the analysis are stored in memory unit 31. For instance, the images or image series that are produced and show crop material flow S from various directions, or the images that document the wear on elevator paddles 46, are stored in memory unit 31. In turn, the images or image series transmitted to control unit 30, or the analytical results can be forwarded to a user interface composed of a display unit/display 26 and an operating unit 27 in driver's cab 28 of combine harvester 1. The images or image series can be displayed there e.g. to an operator F of self-propelled agricultural harvesting machine 1, thereby enabling operator F to manually change or optimize the adjustment parameters of working assemblies 4, 5, 6, 7, 8, 9, 10, 11, 12, for instance. The adjustment parameters of working assemblies 4, 5, 6, 7, 8, 9, 10, 11, 12 can be also be changed automatically by control unit 30 depending on the default setting in operating unit 27.

Using combine harvester 1 as an example, image recording unit 17 according to the invention is disposed in the region of elevator head 41 of grain elevator 13. In this case, image recording unit 17 shown is equipped with two image detectors 18, 20 which are used to record images or image series of crop material S flowing out of grain elevator 13. Two CCD cameras can be used as image detectors 18, 20. The further details regarding the image recording unit are shown in FIG. 2.

FIG. 2 shows a perspective representation of an image recording unit 17 in the region of elevator head 41 of grain elevator 13. Descriptions and details regarding device 15 and control unit 30 which are identical to those presented with reference to FIG. 1 are not repeated in FIG. 2 and are labelled with the same reference characters when the elements are the same.

As shown in FIG. 1, control unit 30 is connected via a data line D to image recording unit 17 according to the invention. Image recording unit 17 can have various technical embodiments. It can comprise two to four stationary image detectors 18, 20 or one or more movably disposed image detectors 18, 20. The principle is to use imaging detectors to detect, with the aid of an optical recording, the separation of crop material flow S in a grain elevator 13 before transfer thereof into a container 14 in order to determine crop material quality. The detection and evaluation method is the same in all three technical embodiments of device 15. Of the three technical embodiments of image recording units 17, the first embodiment of an image recording unit 17 comprising two stationary image detectors 18, 20 is depicted preferably in FIG. 2. Image detectors 18, 20 are diametrically opposed at the outlet of an elevator head 41, i.e. discharge point 40, and are therefore separated by 180 degrees. Image detectors 18, 20 are placed such that one image detector 18 illuminates crop material flow S from top side 22, and the other image detector 20 illuminates crop material flow S from underside 24 and produces images or image series of crop material flow S. The images or image series that are generated are transmitted to control unit 30 for further processing.

In a development (not depicted in FIG. 2) of optimal image recording unit 17, one more image detector is located on both sides of discharge point 40. Using the total of four image detectors 18, 20, it is now possible to detect crop material flow S from all sides, each image detector 18, 20 being disposed approximately perpendicularly to surface 23 of crop material flow S. This technical embodiment of an image recording unit 17 corresponds to the second embodiment described above.

The opening of the angular field of each image detector 18, 20 forms a field of view 42, 43. A yield sensor in the form of a baffle plate 44 and a weight sensor 45 assigned thereto is located within said field of view 42, 43, at outlet 40 of elevator head 41, and can function as an alternative to the yield sensor designed as light barrier 16. Image detectors 18, 20 detect the fill level of crop G in the region of elevator head 41, which is evaluated in control unit 30 using image processing. The result obtained using the image evaluation method can be displayed visually in display 26 of operating unit 27 in driver's cab 28 for operator F. In addition, within the scope of monitoring the operating state of said yield sensor, image detectors 18, 20 detect any contamination of the surface of baffle plate 44; contamination can influence the result of the yield measurement. Depending on the extent of contamination of the surface of baffle plate 44, it is cleaned of deposits using an automatic cleaning unit, for instance.

Image detector 18 disposed on top side 22 of discharge 40 detects—through discharge opening 47 via field of view 42 thereof—elevator paddles 46 circulating in elevator head 41 of grain elevator 13. In addition, a turning region 48 of ascending elevator paddles 46 to descending elevator paddles 46 is visible through discharge opening 47. Turning region 48 starts when an ascending elevator paddle 46 leaves approximately horizontal position 49 thereof and transitions to vertical position 50 thereof. Turning region 48 ends when descending elevator paddle 46 has returned to horizontal position 51 thereof. Image recording unit 17 is triggered when the circulating ascending elevator paddle 46 transitions from horizontal position 49 to vertical position 50.

The triggering initiates the recording of an image or an image series of crop material flow S by image detectors 18, 20.

Crop G conveyed by elevator paddle 46 is accelerated in turning region 48. Due to the acceleration, centrifugal forces are exerted on crop material flow S in turning region 48, thereby inducing separation when crop G is ejected. Image recording unit 17 is now used to detect the composition of crop G using an imaging method.

A yield sensor 16 disposed in grain elevator 13 can also be used to trigger image recording unit 17. As described above, the yield sensor is a light barrier 16 which detects grain material G on an elevator paddle 46. Image recording unit 17 is triggered only if crop G is present on an elevator paddle 46, thereby preventing an image or image series from being recorded unnecessarily.

It is also possible to use upper image detector 18—disposed at discharge point 40—of image recording unit 17 to also optically detect the technical state, such as the surface and the edges of elevator paddle 46, or the absence of an elevator paddle 46. The optical recordings of images or image series of elevator paddle 46 can be displayed to driver F in display 26 of the operating device. In another evaluation method, the images or image series can be evaluated in control unit 30. The evaluation result can be displayed to operator F as visual information in operating device 27. The visual information relates to the technical state of elevator paddle 46.

In contrast, lower image detector 20—disposed at discharge point 40—of image recording unit 17 can also be used to optically detect distance 52 of ascending elevator paddle 46 from elevator head wall 39. The optical recordings of images or image series of elevator paddle 46 and elevator head wall 39 are transmitted to control unit 30 for evaluation. Calculated distance 52 between elevator paddles 46 and elevator head wall 39 are displayed to operator F in the display of operating unit 27. If the calculated value falls below a predetermined value, this is an indication that the chain tension of a chain 53—which carries elevator paddles 46 and is driven in a circulating manner in elevator 13—is too low, or chain 53 should be replaced due to wear. Chain 53 carries elevator paddles 46 which are disposed at equidistant intervals.

In a third embodiment of device 15 described above, it is provided according to the invention for at least one and preferably both stationary image detectors 18, 20 to be movable. This embodiment is not depicted in entirety in FIG. 2. To this end, housing part 19, 21 containing image detector 18, 20 is displaceably disposed at discharge point 40. To displace housing part 19, 21, housing part 19, 21 is connected via a connecting means to a drive unit which is not depicted. Discharge point 40 comprises a longitudinal slot through which the image or image series can be recorded.

It will be understood that each of the elements described above, or two or more together, may also find a useful application in other types of constructions differing from the types described above.

While the invention has been illustrated and described as embodied in a device for detection and determination of the composition of bulk material, it is not intended to be limited to the details shown, since various modifications and structural changes may be made without departing in any way from the spirit of the present invention.

Without further analysis, the foregoing will so fully reveal the gist of the present invention that others can, by applying current knowledge, readily adapt it for various applications without omitting features that, from the standpoint of prior art, fairly constitute essential characteristics of the generic or specific aspects of this invention.

What is claimed as new and desired to be protected by Letters Patent is set forth in the appended claims:

The invention claimed is:

1. A device for detection and determination of a composition of a bulk material, comprising:
   an image recording unit;
   at least one control unit;
   at least one memory unit;
   wherein said image recording unit has at least two image detectors for recording images or image series of the crop material flow at equidistant intervals or permanently, wherein one of said image detectors is disposed substantially perpendicularly to a top side of a surface of the crop material flow emerging from a grain elevator head or a discharge chute, and another one of the two image detectors is disposed substantially perpendicularly to an underside of a surface of the crop material flow;

a selection unit to enable a qualified determination to be made, during a transfer of a crop material flow into a container of an agricultural harvesting machine, of a composition of a crop during processing of the crop material using the images or image series, so that adjustment parameters of working assemblies of the agricultural harvesting machine are changeable during the processing of the crop material; and wherein the at least one control unit is configured to operate an algorithm for determining a volumetric flow rate of the crop material flow and a compressability of the crop using the images or image series.

2. The device as defined in claim 1, wherein said two image detectors are offset by 180° relative to one another as viewed at an angle in a circumferential direction of an imagined circular trajectory.

3. The device as defined in claim 1, wherein said image detectors are disposed opposite one another.

4. The device as defined in claim 1, wherein said image detectors include a lower image detector disposed on the elevator head or the discharge chute such that a fill level in the elevator head or the discharge chute is determinable in the control unit using an image evaluation method, and is depicted in a display device of an operating unit.

5. The device as defined in claim 1, wherein at least one of said image detectors illuminates the crop material flow flowing between said two image detectors, and another one of said image detectors opposite to said one image detector detects an incident light.

6. The device as defined in claim 1, further comprising elevators paddles which trigger said image recording unit to start recording an image or image series when one of said elevator paddles has reached a beginning of a turning region in the elevator head.

7. The device as defined in claim 6, wherein when a grain elevator idles, an upper one of the image detectors produces images or image series of elevator paddles, used for an action selected from a group consisting of displaying in a display unit, comparing in the control unit with selected images to identify wear on the elevator paddles, and both.

8. The device as defined in claim 1, further comprising a yield elevator triggering said image recording unit to start recording the images or image series.

9. The device as defined in claim 1, wherein while the grain elevator idles, a lower one of said image projectors produces images or image series of elevator paddles and an elevator head wall, which are used to determine a distance of the elevator paddles from the elevator head wall.

10. The device as defined in claim 9, wherein said image detectors are offset by 90° relative to one another as viewed at an angle in a circumferential direction of an imagined circular trajectory.

11. The device as defined in claim 1, wherein the image recording unit includes up to four of said image detectors for recording images or image series of the crop material flow at equidistant intervals or permanently, and wherein said one image detector is disposed substantially perpendicularly to the top side of the surface of the crop material flow emerging from the elevator head or discharged through it, said another image detector is disposed substantially perpendicularly to an underside of the surface of the crop material flow, and two diametrically opposed remaining image detectors are disclosed substantially perpendicular to a lateral surface of the crop material flow.

12. The device as defined in claim 1, wherein said image recording unit has said least one image detector disposed substantially perpendicularly to the top side of a surface of the crop material flow emerging from the elevator head or discharged to it, such that it can move along a circular arc, and wherein said at least one image detector is displaced between 0° and 180° on a circular arc in an alternating manner.

* * * * *